United States Patent
Demandolx

(10) Patent No.: US 8,644,638 B2
(45) Date of Patent: Feb. 4, 2014

(54) AUTOMATIC LOCALIZED ADJUSTMENT OF IMAGE SHADOWS AND HIGHLIGHTS

(75) Inventor: Denis Demandolx, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 519 days.

(21) Appl. No.: 13/034,811

(22) Filed: Feb. 25, 2011

(65) Prior Publication Data
US 2012/0219218 A1 Aug. 30, 2012

(51) Int. Cl.
*G06K 9/40* (2006.01)

(52) U.S. Cl.
USPC .......................... 382/274; 382/167; 382/168

(58) Field of Classification Search
None
See application file for complete search history.

(56) References Cited

U.S. PATENT DOCUMENTS

| | | | |
|---|---|---|---|
| 5,818,975 A * | 10/1998 | Goodwin et al. | 382/274 |
| 7,068,841 B2 | 6/2006 | Luo | |
| 8,295,606 B2 * | 10/2012 | Li et al. | 382/195 |
| 8,391,646 B2 * | 3/2013 | Shingai et al. | 382/298 |
| 2003/0053690 A1 * | 3/2003 | Trifonov et al. | 382/168 |
| 2003/0235342 A1 * | 12/2003 | Gindele | 382/260 |
| 2004/0086159 A1 * | 5/2004 | Lary et al. | 382/128 |
| 2006/0239550 A1 * | 10/2006 | Pulsifer | 382/168 |
| 2006/0256214 A1 | 11/2006 | MacLean et al. | |
| 2007/0036457 A1 * | 2/2007 | Saquib et al. | 382/274 |
| 2008/0175507 A1 * | 7/2008 | Lookingbill et al. | 382/255 |
| 2008/0267524 A1 | 10/2008 | Shaked et al. | |
| 2009/0060388 A1 * | 3/2009 | Shingai et al. | 382/298 |
| 2009/0290807 A1 | 11/2009 | Marchesotti | |
| 2010/0195906 A1 | 8/2010 | Uliyar et al. | |
| 2012/0219218 A1 * | 8/2012 | Demandolx | 382/168 |
| 2012/0314971 A1 * | 12/2012 | Yuan et al. | 382/274 |

OTHER PUBLICATIONS

Safonov, Ilia V., "Automatic correction of amateur photos damaged by backlighting", Retrieved at << http://www.makseq.com/materials/lib/Articles-Books/Filters/BackLighting/paper24.pdf >>, 2006, pp. 8.
Han, et al., "Automatic Illumination and Color Compensation Using Mean Shift and Sigma Filter", Retrieved at << http://ieeexplore.ieee.org/stamp/stamp.jsp?tp=&arnumber=5278052 >>, IEEE Transactions on Consumer Electronics, vol. 55, No. 3, Aug. 2009, p. 978-986.
Grundland, et al., "Automatic Contrast Enhancement by Histogram Warping", Retrieved at << http://www.eyemaginary.com/Rendering/AutomaticHistogramWarping.pdf >>, 2004, pp. 1-8.

* cited by examiner

*Primary Examiner* — Sean Motsinger

(57) ABSTRACT

The shadows and highlights regions of an image can be automatically optimized in a localized manner. A mask can be generated that can automatically identify local regions of a digital image as highlight regions or shadow regions. Different processing can then be automatically applied to highlight regions separately from the shadow regions. Luminance histograms can be obtained for the overall digital image, as well as those portions of the digital image that are in the highlights regions and, separately, the shadows regions. The moments of those histograms, including the average and the variance, can be compared to target moments and processing can continue to be applied to highlights regions and, separately, shadows regions, until one or more target moments are achieved. Target moments can be generated from original moments of the original image histograms based on relationships generated from a prior manual optimization of a reference set of images.

20 Claims, 7 Drawing Sheets

AUTOMATIC LOCALIZED ADJUSTMENT OF IMAGE SHADOWS AND HIGHLIGHTS

BACKGROUND

It is well known that the ability of the human eye to simultaneously perceive details in both brightly and dimly lit areas is unmatched by traditional image capture devices. Consequently, a photographer may perceive a scene via their naked eye as having detail in both brightly lit and dimly lit areas, but, when photographed, the resulting photograph of that same scene can comprise brightly lit areas that are "washed out" and devoid of detail, and can comprise dark areas that are, analogously, too dark and, likewise, devoid of detail. Professional photographers are well aware of this pitfall and guard against it through a variety of means that can be implemented prior to capturing the image. Amateur photographers, on the other hand, are traditionally not aware of such limitations in their image capture equipment and, as a result, obtain images that are devoid of detail.

With the advent of digital image capture and digital image processing techniques, various mechanisms can be applied after an image is captured to ameliorate the loss of detail in brightly or dimly lit areas of the image. Typically such mechanisms are referred to as "highlight and shadow" processing. Manual highlight and shadow processing functionality can be found in most digital image editing software application programs. However, because the highlight and shadow processing offered by such programs is manually adjusted by the user, the ability to improve a given image is directly dependent upon the ability of that user to utilize such functionality in a skilled and informed manner. Unfortunately, those users that are not sufficiently savvy to avoid taking such photographs in the first place are, similarly, unlikely to be skilled at utilizing the highlight and shadow processing to fix such photographs after the fact.

In recognition of this dichotomy, some digital image editing software application programs offer automated highlight and shadow processing, often nominated "auto exposure". Such automated processing, however, applies the same modifications to the entire digital image. There is no attempt made, by such automated processing, to distinguish which areas of the digital image represent highlights, which areas represent shadows, and treat those areas differently, or apply different modifications to those distinct areas. Instead, such automated highlight and shadow processing determines the digital modifications to be applied based on the whole image, in aggregate, and applies those modifications to the whole image.

SUMMARY

In one embodiment, automated highlight and shadow processing is performed locally on a digital image such that individual areas of that digital image can have different highlight and shadow processing applied to them.

In another embodiment, a mask is generated to identify those portions of a digital image that represent highlight areas of the digital image and to identify those portions of a digital image that represent shadow areas of the digital image. Such a mask can be generated by applying a Gaussian blur to the digital image being processed, thereby categorizing small details in the same manner as their surroundings. Additionally, the result of the Gaussian blur can be blended with the original image to retain any sharp transitions between areas identified as highlights and areas identified as shadows.

In a further embodiment, the highlight and shadow processing to be automatically applied can be based on a set of targets that can be derived from one or more luminance histograms, including a luminance histogram for the entire digital image, and separate luminance histograms representing the shadow regions and highlight regions, independently. A mean value, a variance value, and other moment values of the luminance histograms can be utilized to generate target moment values, including a target mean value and a target variance value. The highlight and shadow regions can then be automatically processed until at least one moment value reaches a target moment value.

In a still further embodiment, mechanisms for deriving target moment values from existing moment values of luminance histograms can be obtained from a reference set of digital images. The reference set of digital images can be manually adjusted to optimize the display of details in both highlight and shadow regions of those digital images. Luminance histograms of the original images, including histograms individually representing the shadow regions, and separately, the highlight regions, can be compared to luminance histograms of the manually modified images. From such a comparison, mechanisms for deriving target moment values from original moment values can be obtained.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
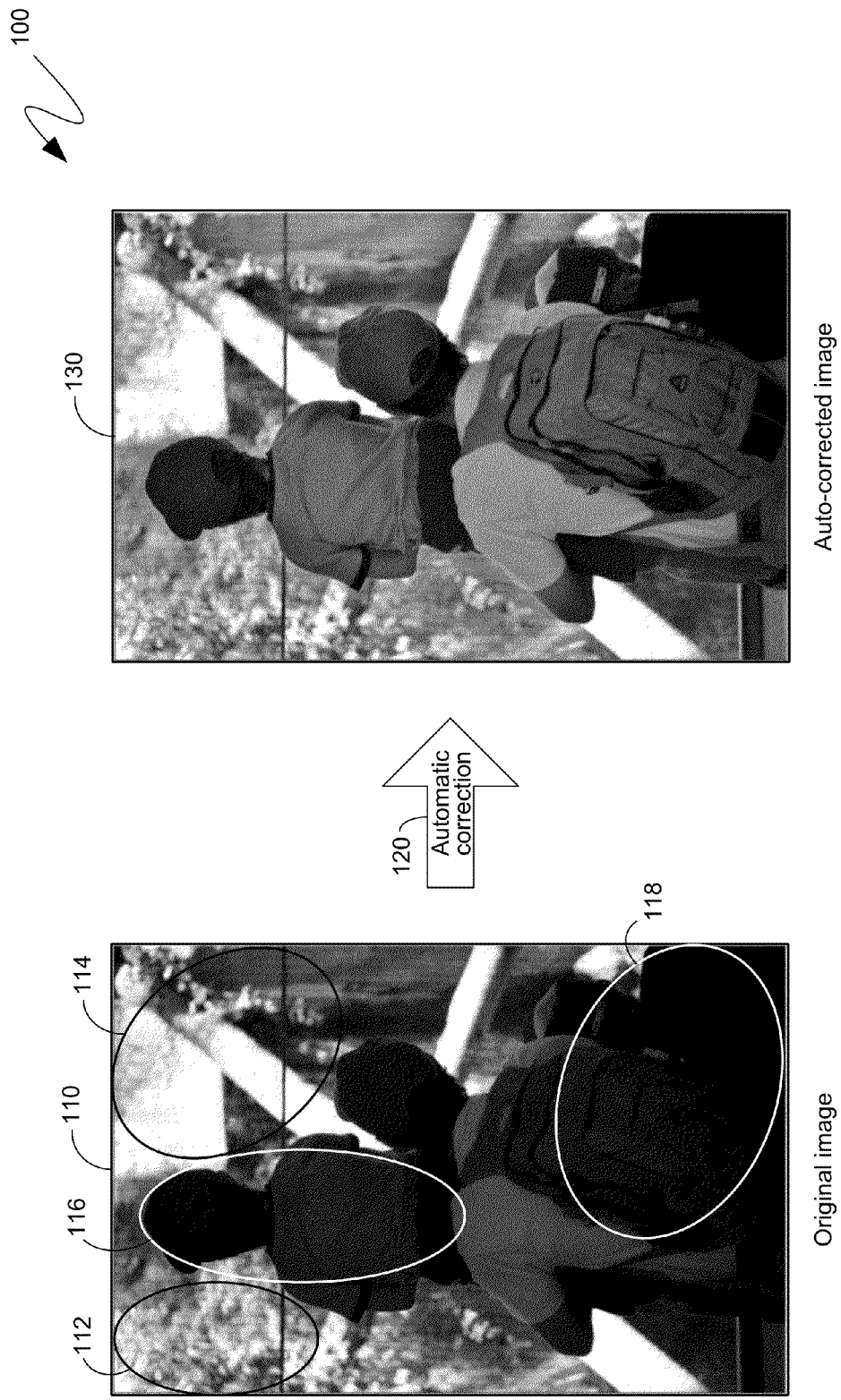
FIG. 1 is a block diagram of an exemplary automatic and localized adjustment of the shadows and highlights regions of an image.

The following description relates to mechanisms for automatically adjusting the shadows and highlights regions of an image in a localized manner. A mask can be generated that can automatically identify local regions of a digital image as highlight regions or shadow regions. Different processing can then be automatically applied to highlight regions separately from the shadow regions. Luminance histograms can be obtained for the overall digital image, as well as those portions of the digital image that are in the highlights regions and, separately, the shadows regions. The moments of those histograms, including, for example, the average and the variance, can be compared to target moments and processing can continue to be applied to the highlights regions and, separately, the shadows regions, until one or more target moments are achieved. The target moments can be generated from the original moments of the original image histograms based on relationships generated from a prior manual optimization of a reference set of images.

For purposes of illustration, the techniques described herein make reference to a single static digital image. Such references, however, are strictly exemplary and are not intended to limit the mechanisms described to the processing of static digital images. Indeed, the techniques described are equally applicable to any one or more digital images or sequences of digital images, including those found in digital movies and other dynamic digital image content. Additionally, the techniques described herein are also equally applicable to digital images irrespective of the manner in which such images were captured, including digital images captured through digital cameras, digital scans of analog images, and generated digital images.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, a system 100 is shown, comprising an exemplary digital image 110 and an exemplary auto-corrected digital image 130. As can be seen from a visual comparison of the images 110 and 130, the auto-corrected image 130 improves the presentation of details in shadow areas, such as those areas of the original image 110 that appear as dark, detail-less areas. The adjustments applied to the original image 110 can be applied in an automatic manner, as illustrated by the action 120. In one embodiment, the automatic correction, represented by the action 120, that is applied to the original image 110 can be applied in a localized manner such that the adjustment performed to shadow areas of the original image 110, such as the areas roughly delineated by the ellipses 116 and 118, can enable the details in those areas to be revealed, such as shown in the auto-corrected image 130, while at the same time applying only minimal adjustments to the highlight areas of the original image 110, such as the areas roughly delineated by the ellipses 112 and 114, thereby preserving the details already shown in those areas in the original image 110. As will be recognized by those skilled in the art, were such a localized adjustment not applied, and, instead, were the adjustments to the original image 110, represented by the action 120, applied globally to the entire image, the resulting image would either retain shadow regions that were substantially devoid of details, or would end up with highlight regions that were too bright and which would lose the details that were originally present in those areas.

Figure 2:
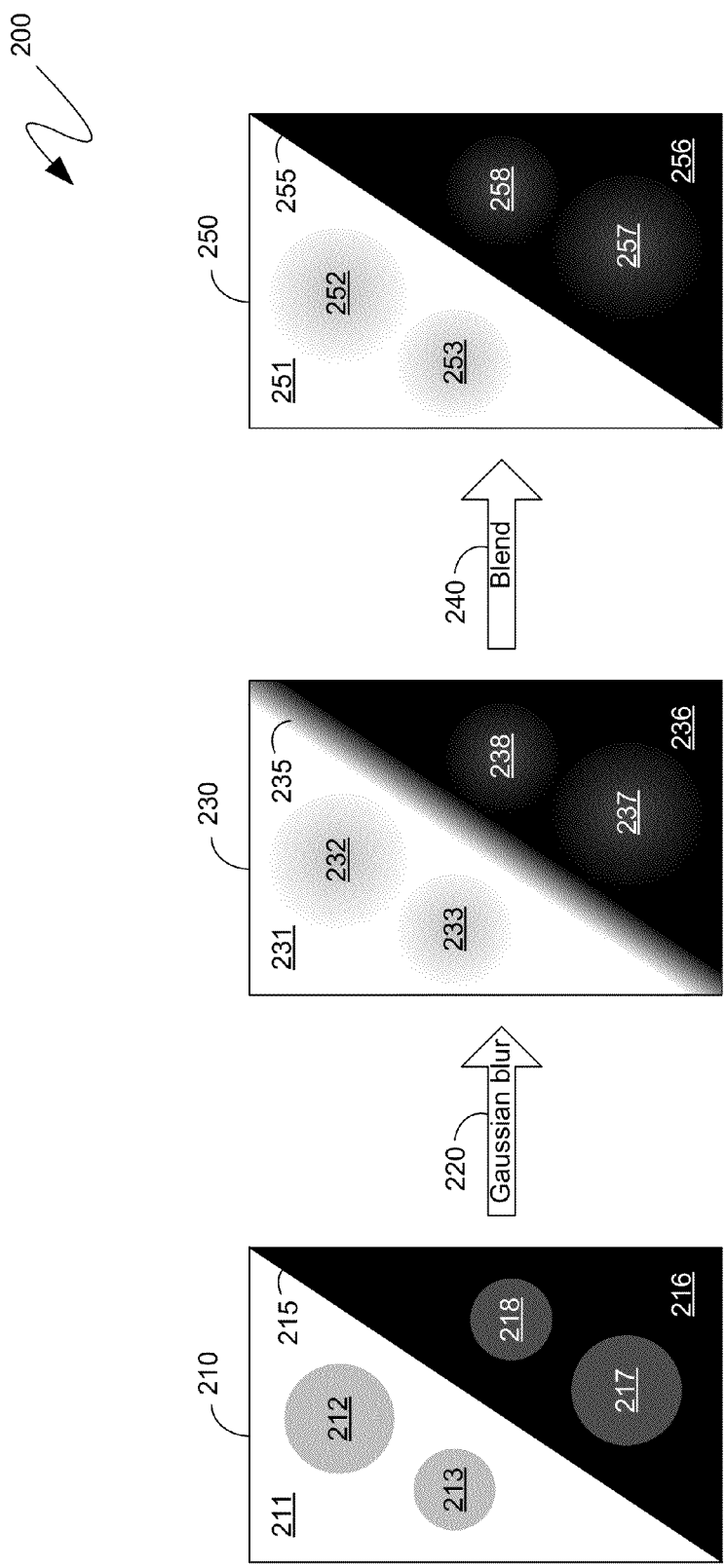
FIG. 2 is a block diagram of an exemplary generation of a mask to automatically identify highlights and shadows regions in an image.

Turning to FIG. 2, a system 200 illustrates one exemplary mechanism for identifying which pixels, or other quanta of a digital image, are to be considered as part of a specific, localized area, or aspect, of an image, such as, for example, which pixels are to be considered as part of a highlights area or a shadows area of an image. The system 200 illustrates one such exemplary mechanism with reference to a simplified, exemplary image 210 comprising a highlights region 211 and the shadows region 216. Additionally, for purposes of illustration of the one exemplary mechanism, the simplified, exemplary image 210 comprises details 212 and 213 within the highlights region 211, and details 217 and 218 within the shadows region 216. As will be recognized by those skilled in the art, the pixels of the details 212 and 213 that are within the highlights region 211 should be considered as part of the highlights region 211 for purposes of determining which pixels are to receive highlight-specific adjustments, even though such pixels may be substantially darker in luminosity than other pixels within the highlights region 211. Similarly, the pixels of the details 217 and 218 that are within the shadows region 216 should, likewise, be considered as part of the shadows region 216 for purposes of determining which pixels are to receive shadow-specific adjustments, even though such pixels may be substantially lighter in luminosity than other pixels within the shadows region 216.

Thus, to derive a mask from the image 210 that can be utilized to assign each pixel of the image 210 as being either a highlight region pixel, a shadow region pixel, or some combination thereof, the discrepancy, in luminosity, between the details 212 and 213 and the surrounding region 211, and the discrepancy between the details 217 and 218 and the surrounding region 216, can be reduced. In one embodiment, to reduce such a discrepancy in luminosity, a Gaussian blur can be applied to the image 210, as illustrated by the action 220.

As will be recognized by those skilled in the art, the application of the Gaussian blur, such as by the action 220, can, colloquially, "fade" the various details 212, 213, 217 and 218 into their surrounding regions 211 and 216, respectively. Thus, as shown in the system 200 of FIG. 2, the exemplary image 230 that can result from the application of the Gaussian blur, as shown by the action 220, to the exemplary image 210, can comprise a highlights region 231, corresponding to the highlights region 211 of the exemplary image 210, and a shadows region 236, corresponding to the shadows region 216 of the exemplary image 210. Within the highlights region 231, the details 232 and 233, corresponding to the details 212 and 213 in the exemplary image 210, can, in the resulting image 230, be more diffuse, resulting in larger details regions 232 and 233, with each of those regions having less difference, in their luminosity, between them and the surrounding highlights region 231. Similarly, within the shadows region 236, the details 237 and 238, corresponding to the details 217 and 218 in the exemplary image 210, can, in the resulting image 230, likewise be more diffuse, again resulting in larger details regions 237 and 238, with each of those regions having less difference, in their luminosity, between them and the surrounding shadows region 236. This decrease in the difference between the luminosity of the details regions, such as the details regions 232, 233, 237 and 238, and their surrounding regions, such as the highlights region 231 and the shadows region 236, respectively, can enable, as will be described in further detail below, the resulting image 230 to act as a mask that can be utilized to identify those pixels that belong to highlights regions and those pixels that belong to shadows regions, including the pixels of details regions within greater highlights regions and shadows regions.

As will be recognized by those skilled in the art, the application of a Gaussian blur, as illustrated by the action 220, typically requires specifying the radius of the Gaussian blur being applied. In one embodiment, the Gaussian blur applied by the action 220 can have a radius of between 2% and 10% of a dimension of the image 210 to which the Gaussian blur is being applied. Empirical testing has revealed that a Gaussian blur radius of 4% of the smallest dimension of the image to which the Gaussian blur is being applied works well. As will be recognized by those skilled in the art, the term "radius" as utilized herein means the standard deviation of the Gaussian distribution used as the kernel of the Gaussian filter. In the particular example being illustrated in the system 200 of FIG. 2, the exemplary image 210 is rectangular in shape and, consequently, its height dimension is greater than its width dimension. Thus, in that particular example, the Gaussian blur being applied by the action 220 can have a radius of 4% of the width of the exemplary image 210. In one embodiment, to optimize performance, large kernel Gaussian blurs can be efficiently approximated with three or four subsequent box blurs.

As shown in the exemplary system 200 of FIG. 2, the exemplary image 210 comprises a precise delineation 215 between the highlight region 211 and the shadow region 216. Unfortunately, the application of the Gaussian blur, as illustrated by the action 220, can not only blur the details regions, such as in the manner described in detail above, but can also result in a diffused, or blurred, transition 235 between the highlight region 231 and the shadow region 236 of the image 230. Unlike in the case of the details regions, where a blurring of those regions, and a decrease in the difference in luminosity intensities between those regions and their surrounding regions can be desirable, in the case of the transition 235, it can be more desirable to retain a precise delineation, such as the delineation 215, as opposed to a blurred delineation 235. For example, as will be recognized by those skilled in the art, the blurring of the transition 235 can result in the application of shadow-centric processing to pixels that are on the highlights region side and, similarly, the application of highlight-centric processing to pixels that are on the shadows region side. The visual impact of such an occurrence can be "halos" or other similar visual artifacts in the region near the transition 235.

In one embodiment, to eliminate such blurring in an area that is properly transitioning between a highlights region and a shadows region, and not merely details within a highlights region or a shadows region, a blending can be applied such that the sharp delineation 215 is retained from the exemplary image 210, while the blurring present in other areas of the resulting image 230 are otherwise retained for the beneficial reasons described above. Thus, as shown by the blend action 240 of the exemplary system 200 of FIG. 2, a blended image 250 can be generated that comprises the blurred and less distinct, in luminosity intensity, details regions 232, 233, 237 and 238 from the resulting image 230, while also retaining the sharp delineation 215 from the exemplary image 210.

One exemplary mechanism for performing the blend action 240 can be to simply retain the resulting image 230 except in areas where the gradient of the Gaussian blur that is applied by the action 220 is near its theoretical maximum. In those areas, the corresponding portions of the exemplary image 210 can be utilized instead. For example, the blended image 250 can be expressed as a mathematical combination of the exemplary image 210 and the resulting image 230 that results after the Gaussian blur of the action 220 is applied to the exemplary image 210. Such an expression can be in the form of:

$$\text{blended image} = \text{gaussian image} + (\text{original image} - \text{gaussian image}) \times \frac{\text{magnitude of the gradient}}{\text{maximum magnitude of the gradient}}.$$

As will be recognized by those skilled in the art, in the areas where the magnitude of the gradient in the resulting image 230, referred to as the "gaussian image" in the above expression, is slight, or close to zero, such as in a majority of the highlights region 231 and the shadows region 236, the above expression becomes $$\text{blended image} = \text{gaussian image} + (\text{original image} - \text{gaussian image}) \times \frac{0}{\text{maximum magnitude of the gradient}},$$

which reduces to blended image=gaussian image+0=gaussian image. Conversely, in areas where the magnitude of the gradient in the resulting image 230 is near its theoretical maximum, such as in the transition area 235, the above expression becomes $$\text{blended image} = \text{gaussian image} + (\text{original image} - \text{gaussian image}) \times \frac{\text{maximum magnitude of the gradient}}{\text{maximum magnitude of the gradient}},$$

which reduces to blended image=gaussian image+(original image−gaussian image)×1=original image. Thus, as shown by the blended image 250, the transition 255 between the highlights region 251 and the shadows region 256 can be nearly equivalent to the transition 215 in the exemplary image 210, while the details 252, 253, 257 and 258, as well as the highlights region 251 and the shadows region 256, can be nearly equivalent to the details 232, 233, 237 and 238, as well as the highlights region 231 and the shadows region 236, from the resulting image 230, respectively.

As indicated previously, the goal of the actions illustrated in the exemplary system 200 of FIG. 2 is to generate a mask that can be utilized to identify pixels as belonging to a highlights region, a shadows region, or some combination thereof. In one embodiment, the luminosity intensity of the blended image 250 can be utilized as a mask from which the assigning of each pixel as a highlights region pixel, a shadows region pixel, or some combination thereof, can be performed. For example, if the luminosity of the image 250 is considered upon a standard scale ranging from 0 to 1, where a value of zero represents no luminosity, or absolute black, and a value of one represents the highest possible luminosity or, absolute white, a pixel's luminosity value can be considered as an indicator of that pixel's assignment to the highlights region and, conversely, a value of one minus that pixel's luminosity value can be considered as an indicator of that pixel's assignment to the shadows region. For example, a pixel within the region 252 that can have a high luminosity value, but yet not a luminosity value of 1, such as, for example, a luminosity value of 0.75, can be considered to be 75% assigned to, or 75% a part of, the highlights region, and 25% assigned to, or 25% a part of, the shadows region. As will be described in further detail below, such a determination can enable the modifications that are applied to the highlights region to be only 75% applied to the above exemplary pixel, and can further enable the modifications that are applied to the shadows region to be only 25% applied to the above exemplary pixel.

Figure 3:
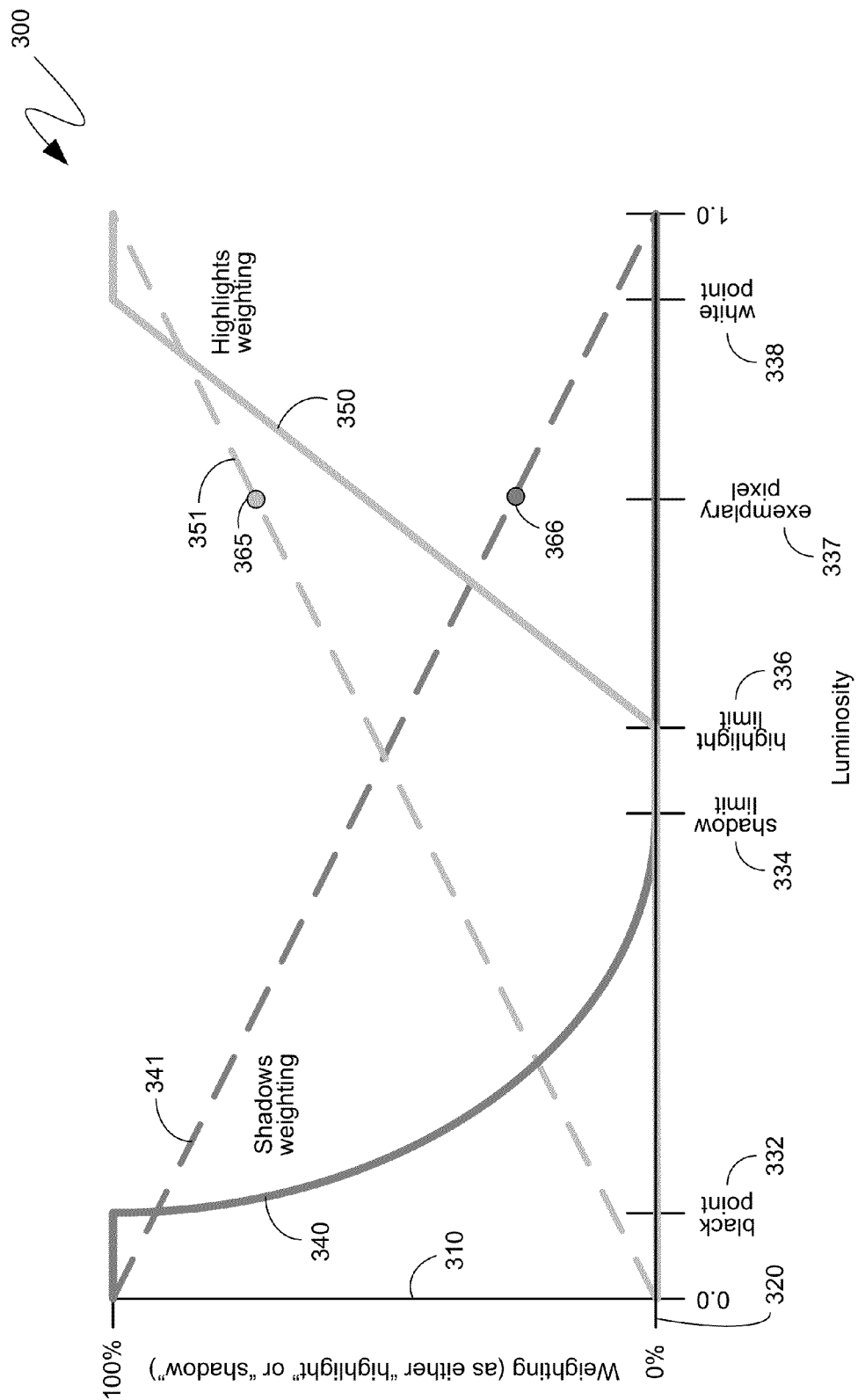
FIG. 3 is a chart diagram of an exemplary weighting of highlights and shadows regions in an image.

While the luminosity intensity of the image 250 can be directly utilized as a mask to quantify each pixel as a highlights region pixel, a shadows region pixel, or some combination thereof, in another embodiment the weighting of a pixel as belonging to either the highlights region, the shadows region, or some combination thereof, can be slightly modified to produce more visually appealing automatic enhancement and adjustment of the highlights and shadows regions. For example, the graph 300, shown in FIG. 3, illustrates one exemplary, nonlinear, translation between the luminosity values present in, for example, the blended image 250, and the resulting shadow and highlight weighting assigned to a pixel having those luminosity values. By way of illustration, the dotted lines 311 and 321 represent the straightforward weighting that was described above. For example, the exemplary pixel described above can have a luminosity intensity at the position 337 along the luminosity axis 320 of the graph 300, as shown in FIG. 3. Such an exemplary pixel, as indicated previously, can be assigned as 25% belonging to the shadows region, as indicated by the point 366 on the straightforward, linear shadow weighting function 341, and can be assigned as 75% belonging to the highlights region, as indicated by the point 365 on the straightforward, linear highlight weighting function 351.

Rather than generating the weighting with which a specific pixel will be considered as part of the shadows region, the highlights region, or some combination thereof from the above-described straightforward, linear weighting, such as that illustrated by the weighting functions 341 and 351, another embodiment contemplates the use of piecewise and non-linear weighting functions, such as the weighting functions 340 and 350 shown in the graph 300. More specifically, to improve visual appearance, a black point luminosity 332 can be optionally established such that pixels having a luminosity less than the black point luminosity 332 are weighted as 100% belonging to the shadows region. Similarly, to also improve visual appearance, a white point luminosity 338 can also be optionally established such that pixels having a luminosity greater than the white point luminosity 338 are weighted as 100% belonging to the highlights region. Thus, as shown in the graph 300, the shadows weighting function 340 can be a piecewise function that can result in all pixels having luminosity values lower than the black point luminosity value 332 being assigned a weighting of 100% belonging to the shadows region. Similarly, as also shown in the graph 300, the highlights weighting function 350 can, likewise, be a piecewise function that can result in all pixels having luminosity values greater than the white point luminosity value 338 being assigned a weekend of 100% belonging to the highlights region.

The black point luminosity value 332 and the white point luminosity value 338 can be independently established. For example, in one embodiment, the black point luminosity value 332 can be simply set to a luminosity value of zero. In another embodiment, the black point luminosity value 332 can be set to be equal to the dark current average of the original image 110 (shown in FIG. 1). Similarly, in one embodiment the white point luminosity value 338 can simply be set to luminosity value of one. In another embodiment, the white point luminosity value 338 can be set to be equal to the highest in the range luminosity in the original image 110 (shown in FIG. 1).

In one embodiment, the piecewise highlights weighting function 350 can linearly progress from a highlight limit luminosity value 336 to the white point luminosity value 338 described previously. The highlight limit luminosity value 336 can be established, together with a shadow limit luminosity value 334, to provide that, so long as the highlight limit luminosity value 336 is greater than the shadow limit luminosity value 334, no pixel is weighted as belonging to both the shadows region and the highlights region. However, in other embodiments, the highlight limit luminosity value 336 can be set to be lower than the shadow limit luminosity value 334. Indeed, as will be described further below, such embodiments can provide for a visually preferable result. As shown in the graph 300 of FIG. 3, the highlight limit luminosity value 336 can be a luminosity value that is selected such that all pixels having luminosity values greater than the highlight limit luminosity value 336 are at least somewhat weighted as belonging to the highlights region. More colloquially, the highlight limit luminosity value 336 can be the highest luminosity value that a pixel can have and still not be weighted as, even in part, belonging to the highlights region. Consequently, the piecewise highlights weighting function 350 can apply a highlights weighting of zero to all pixels having a luminosity less than or equal to the highlight limit luminosity 336, then linearly increase the highlights weighting applied to those pixels having luminosity values between the highlight limit luminosity value 336 and the white point luminosity value 338, and then apply a highlights weighting of 100% to all pixels having a luminosity value greater than or equal to the white point of luminosity value 338. Mathematically, the weighting of a pixel as belonging to a highlights region can be expressed as:

$$\text{Min}\left(1, \text{Max}\left(0, \left(\frac{\text{luminance} - \text{highlight limit}}{\text{white point} - \textit{highight limit}}\right)\right)\right).$$

In a similar manner, the shadows weighting function 340 can be a piecewise function that can apply a shadows weighting of zero to all pixels having a luminosity greater than or equal to the shadow limit luminosity value 334, and can apply a shadows weighting of 100% to all pixels having a luminosity less than or equal to the black point luminosity value 332. Thus, like the highlight limit luminosity 336, the shadow limit luminosity 334 can, colloquially, be considered as the lowest luminosity value that a pixel can have and yet still not be weighted as, even in part, belonging to the shadows region. As will be indicated further below, while the shadow limit luminosity 334 is shown as being lower than the highlight limit luminosity 336, thereby providing that no pixels are weighted as belonging to both, at least in part, the shadows region and the highlight region, the shadow limit luminosity 334 can be set independently of the highlight limit luminosity 336 and can be set to be higher than the highlight limit luminosity 336.

Turning back to the shadows weighting function 340, rather than decreasing in a linear manner from the black point luminosity value 332 to the shadow limit luminosity value 334, the shadows weighting function 340 can, instead, decrease in a nonlinear manner, such as that illustrated in the graph 300. For example, the shadows weighting function 340 can decrease in a manner inversely proportional to the square of the luminosity value, such that the shadows weighting applied to pixels having luminosity values between the black point luminosity value 332 and the shadow limit luminosity value 334 decreases from 100% to 0% in the manner shown in the graph 300. Mathematically, the weighting of a pixel as belonging to a shadows region can be expressed as:

$$\text{Min}\left(1, \left[\text{Max}\left(0, \left(\frac{\text{luminance} - \text{highlight limit}}{\text{white point} - \text{highlight limit}}\right)\right)\right]^2\right).$$

As indicated, empirical evidence suggests that such an parabolic decrease in the shadows weighting applied to a given pixel can produce a more visually appealing result.

In one embodiment, the shadow limit luminosity value 334 can be set to a lower luminosity than the highlight limit luminosity value 336, such as, for example, shown in the exemplary graph 300 of FIG. 3. In such an embodiment, as indicated previously, no pixels would be weighted as belonging to both the highlights region and the shadows region. In fact, pixels having luminosity values that are higher than the shadow limit luminosity value 334 and lower than the highlight limit luminosity value 336 would not be weighted as either belonging to the shadows region nor the highlights region. In another embodiment, however, the shadow limit luminosity value 334 can be set independently of the highlight limit luminosity value 336 such that the shadow limit luminosity value 334 can be higher than the highlight limit luminosity value 336. As will be recognized by those skilled in the art, in such an embodiment, those pixels having luminosity values higher than the highlight limit luminosity value 336, but lower than the shadow limits luminosity value 334 would be weighted as belonging, at least in part, to both the highlights region and the shadows region.

For example, the highlight limit luminosity value 336 can be set to be equal to the black point luminosity value 332, thereby providing a highlights weighting function 350 that can be analogous to the straightforward, linear highlights weighting function 351, with the exception that the highlights weighting function 350 can still be piecewise with respect to both pixels having luminosity values less than the black point luminosity value 332, which can still be weighted as not belonging to the highlights region, and pixels having luminosity values greater than the white point luminosity value 338, which can still be weighted as wholly belonging to the highlights region. As another example, the shadow limit luminosity value 334 can be set to be the mean luminosity intensity value of those pixels that are found to be highlights region pixels when a regular thresholding algorithm was utilized. In one embodiment, that thresholding algorithm can be one that minimizes intra-class variances within the highlights class or the shadows class, while maximizing the inter-class variance as between the highlights and shadows classes.

The chart 300 illustrates one exemplary mechanism for identifying, from a mask, such as that described above, those pixels to which a weighted highlights-specific adjustment should be applied, those pixels to which a weighted shadows-specific adjustment should be applied, and those pixels to which some weighted combination thereof should be applied. As will be recognized by those skilled in the art, one type of adjustment that can be applied can be described by a tone curve that defines an output result given an input condition. Thus, one tone curve can describe the adjustments being applied to the shadows region while another, independently determined tone curve can describe the adjustments being applied to the highlights region. In such a manner, the adjustments being applied to the original image 110 (shown in FIG. 1) can be applied in a localized manner, with the adjustments being applied to the shadows region being different than the adjustments being applied to the highlights region.

As indicated previously, the goal of the adjustments that are being applied to an image, such as the original image 110 (shown in FIG. 1), is to improve the display of details in shadows regions that are too dark and the display of details in highlights regions that are too bright, such as the highlights regions and shadows regions found in photographs taken by inexperienced photographers. The above descriptions illustrated several mechanisms by which specific pixels in the original image can be identified as belonging, at least in part, to a highlights region and belonging, at least in part, to a shadows region, to enable different adjustments to be applied to each of those regions, thereby enabling localized adjustments. The adjustments described in detail below are described within the context of a "luminance" of a pixel and changes that can be made to that luminance. As will be known by those skilled in the art, one traditional mechanism for determining a luminance value of a pixel in the Red, Green and Blue ("RGB") color space can be expressed as: luminance=0.299*R+0.587*G+0.114*B, where the variables "R", "G" and "B" represent the red, green and blue color values, respectively. However, as will also be recognized by those skilled in the art, alternative luminance-determining formulas can also be utilized. For example, in another embodiment, the luminance value can simply be the largest value of either the red, green or blue color values.

To improve the display of details in both the highlights region and the shadows region, the difference between the luminance values of the pixels that are part of the background in either the highlights region or the shadow region in the luminance values of the pixels that comprise the details in either the highlights region with this shadow region, that are sought to be made more visible, can be increased. An overly simplified example can be presented in the illustration of the effect of increasing the luminance values of the pixels of a shadows region by a simple gain, such as by, for example, a gain factor of 2. In such an overly simplified example, the pixels that comprised the dark background, having, for example, a luminance value of approximately 0.1, would be adjusted by the gain factor to have a luminance value of approximately 0.2, while the pixels that comprised the details in that shadows region, having, for example, luminance values between approximately 0.15 through 0.2, would be adjusted by the gain factor to have luminance values of approximately 0.3 through 0.4. Consequently, as can be seen from this overly simplified example, if the difference in the original luminosity values between those pixels that comprised a dark background and those pixels that comprised the details was a mere 0.05, then the pixels that comprised the details may very well have been hard to distinguish from the pixels that comprised the background. However, after the application of the gain factors in this overly simplified example, the difference in the resulting luminosity values between those pixels that comprised the dark background and those pixels that comprised the details was no longer a mere 0.05, but rather was at least a difference of 0.1 and as high as a difference of 0.2, thereby enabling the details to be more easily perceived.

To improve the display of details in the highlights region, the difference between the luminance values of the pixels comprising the bright background and the luminance values of the pixels comprising the details can likewise be increased, except that, unlike in the case of the shadows region, where such an increase in luminance differences can be achieved by increasing the luminance of the pixels comprising the details, in the highlights regions such an increase in luminance differences can be achieved by decreasing the luminance of the pixels comprising the details, while maintaining, or decreasing at a lesser rate, the luminance of the pixels comprising the background. In general, the adjustments to the luminance of the pixels, or, indeed any visual adjustment to the pixels, can be represented in the form of a tone curve that can map, for example, an input luminance to a modified output luminance. As will be recognized by those skilled in the art, the shape of such a tone curve can be bent such that the difference between the luminance of the pixels that comprise the background and the luminance of the pixels that comprise the details is increased. For example, a tone curve that can be applied to the shadows region can be bent such that the luminance of pixels that comprise the brighter details within the shadows regions can be changed such that those pixels stand out more against the luminance of pixels that comprise the darker background within the shadows regions. Similarly, a tone curve that can be applied to the highlights region can be bent such that the luminance of pixels that comprise the brighter background within the highlights region are changed such that the luminance of pixels that comprise the darker details within the highlights regions can stand out more against the brighter background.

In one embodiment, a tone curve that can be locally applied to the shadows region, to adjust the pixels within that region, can be in the form of:

$$\frac{(\text{amount of enhancement in shadows region} + 1) \times \text{luminance}}{\text{amount of enhancement in shadows region} \times \text{luminance} + 1},$$

where the "luminance" term can reference a normalized luminance value that can be based on the luminance from the original image, such as the original image 110 (shown in FIG. 1), except that it can be normalized to quantify it in the range between 0 and 1 and to take into account the maximum range established by the setting of the black point luminosity value 332 and the white point luminosity value 338, both described in detail above. Mathematically, these conditions can be satisfied by defining the "luminance" utilized in the above expression to be:

$$\text{Min}\left(1, \text{Max}\left(0, \frac{\text{original pixel luminance} - \text{black point luminance}}{\text{white point luminance} - \text{black point luminance}}\right)\right).$$

Similarly, in one embodiment, a tone curve that can be locally applied to the highlights region, to adjust the pixels within that region, can be in the form of:

$$\frac{\text{luminance}}{\text{amount of enhancement in highlights region} + 1 - \text{amount of enhancement in highlights region} \times \text{luminance}},$$

where, again the "luminance" term references the normalized luminance value described above.

The above-described tone curves can be expressed as gain factors that are to be applied to the luminance values of the pixels of the original image to achieve the localized and automatic adjustments contemplated. As will be recognized by those skilled in the art, the output, or result of the application of a gain factor, is simply the input multiplied by the gain factor. Consequently, the gain factor is simply the ratio of the output to the input. In the case of a pixel's luminance value, the gain factor that is applied to a given pixel is the resulting luminance value that is achieved after the gain factor is applied divided by the original luminance value. As indicated previously, in one embodiment, the tone curve that can be applied to the shadows region can be in the form of:

$$\frac{(\text{amount of enhancement in shadows region} + 1) \times \text{luminance}}{\text{amount of enhancement in shadows region} \times \text{luminance} + 1},$$

or, more specifically, such an expression can represent the output (normalized) luminance. The input (again, normalized) luminance is, simply, the "luminance" term. Dividing the output by the input, the gain factor to be applied to the luminance of the pixels in the shadows region can be $$\frac{(\text{amount of enhancement in shadows region} + 1) \times \text{luminance}}{\text{amount of enhancement in shadows region} \times \text{luminance} + 1} \Big/ \text{luminance},$$

which, canceling out the "luminance" terms, becomes $$\frac{\text{amount of enhancement in shadows region} + 1}{\text{amount of enhancement in shadows region} \times \text{luminance} + 1}.$$

The gain factor to be applied to the luminance of the pixels in the shadows region can be, therefore, dependent upon the original luminance of those pixels and an amount of enhancement that is to be applied in the shadows region, which can be automatically and dynamically adjusted as will be described in further detail below. Similarly, in one embodiment, the tone curve that can be applied to the highlights region can be in the form of:

$$\frac{\text{luminance}}{\text{amount of enhancement in highlights region} + 1 - \text{amount of enhancement in highlights region} \times \text{luminance}},$$

or, more specifically, such an expression can represent the output (normalized) luminance. The input (again, normalized) luminance is, simply, the "luminance" term. Dividing the output by the input, the gain factor to be applied to the luminance of the pixels in the highlights region can be $$\frac{\text{luminance}}{\text{enhancement in highlights region} + 1 - \text{enhancement in highlights region} \times \text{luminance}} \Big/ \text{luminance}$$

which, canceling out the "luminance" terms, becomes $$\frac{1}{\text{amount of enhancement in highlights region} + 1 - \text{amount of enhancement in highlights region} \times \text{luminance}}.$$

The gain factor to be applied to the luminance of the pixels in the highlights region can be, therefore, dependent upon the original luminance of those pixels and an amount of enhancement that is to be applied in the highlights region, which, like the amount of enhancement that is to be applied in the shadows region, can be automatically and dynamically adjusted in the manner described in further detail below.

Because of the localized nature in which the contemplated automatic adjustments can be applied, the above gain descriptions have been provided within the context of a gain to be applied to those pixels in the shadows regions and a separately determined gain to be applied to those pixels in the highlights regions. However, as indicated previously, pixels can be weighted as belonging, at least in part, to both a highlight and shadows region. As such, in one embodiment, the gain to be applied to each pixel of an original image can be the gain for the shadows region, multiplied by whatever weighting that pixel has been assigned as belonging to the shadows region, plus the gain for the highlights region, multiplied by whatever weighting that pixel has been assigned as belonging to the highlights region. Additionally, although the above descriptions have been provided within the context of luminance values, one advantage of the gain adjustment described is that it can be directly applied to the color data of each pixel. Thus, for example, in the well-known Red, Green and Blue (RGB) color space, the above-described gain can simply be applied directly to the Red, Green and Blue components of a pixel. In an alternative embodiment, such as the YIQ color space, the gain can be applied to the luma (Y) component.

Figure 4:
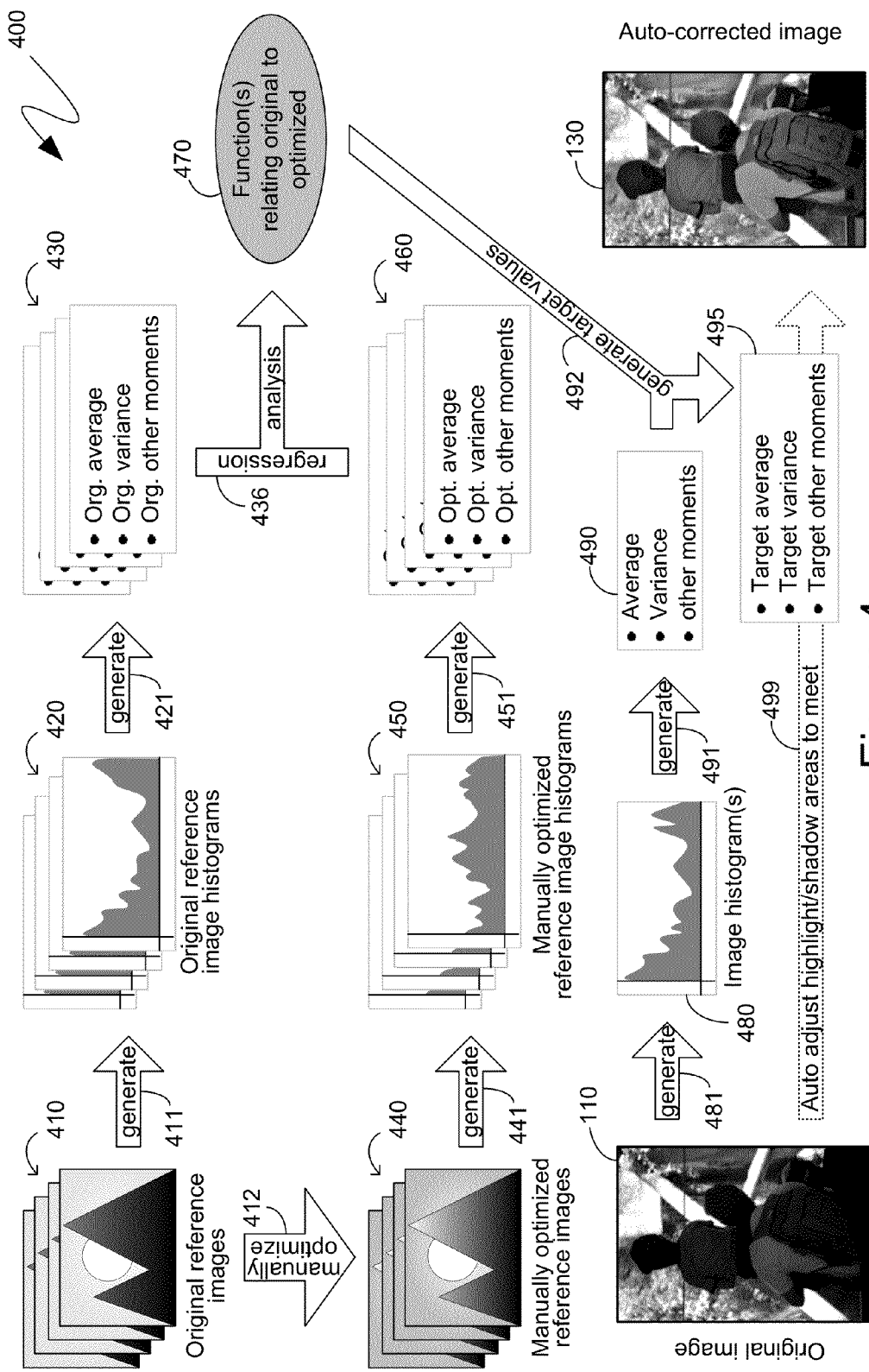
FIG. 4 is a block diagram of an exemplary mechanism for automatically adjusting the shadows and highlights regions of an image in a localized manner.

Turning to FIG. 4, the system 400 illustrates one exemplary mechanism for automatically determining the amount of enhancements that are to be applied to the highlights regions and shadows regions. Initially, a set of original reference of images 410 can be selected. In one embodiment, the set of original reference images 410 can simply be images that exhibit a typical loss of detail in highlights regions and shadows regions, such as would be found in the sorts of photographs that users would want to automatically adjust. From the set of original reference images 410, one or more histograms, such as the original reference image histograms 420 can be generated, as shown by the generation action 411. As will be recognized by those skilled in the art, a histogram of an image can be a graphical representation illustrating the quantity of pixels having particular characteristics, such as, for example, a particular luminosity intensity. For example, a range of luminosity intensity values can be arranged along the horizontal axis of the histogram, and then for each luminosity intensity value, the height of a bar at that luminosity intensity value can represent the number of pixels in the image having that luminosity intensity value.

In one embodiment, each original reference image from the set of original reference images 410 can, via the action 411, have at least three original reference image histograms, such as original reference image histograms in the set 420, generated for it. One such original reference image histogram can be a traditional histogram of the original reference image. Another original reference image histogram can be a histogram of those regions of the original reference image that had been identified as shadows regions, and a third original reference image histogram can be a histogram of those regions of the original reference image that had been identified as highlights regions. The identification, or weighting, of pixels in the original reference images as belonging, at least in part, to either a highlights region or a shadows region, can be performed using any number of methodologies, including, for example, delineating such highlight regions and shadows regions manually, or, alternatively, through automated mechanisms such as those described in detail above.

For pixels that are identified as only being partially weighted in either the highlights region, the shadows region, or some combination thereof, the resulting original reference image histograms can take such weightings into account. For example, if an exemplary pixel is only weighted as belonging 50% to the shadows region, then, when generating a shadows region histogram, such as via the action 411, the generated histogram can count such an exemplary pixel as only half a pixel when totaling the number of pixels in the shadows region having the same luminance value as the exemplary pixel. Similarly, if that exemplary pixel was also weighted is belonging 25% to the highlights region, then, when generating a highlights region histogram, the generated histogram can count such an exemplary pixel as only one quarter of the pixel when totaling the number of pixels in the highlights region having the same luminance value as the exemplary pixel. However, when generating a histogram for the overall image, the exemplary pixel can be counted as a full pixel when totaling the number of pixels in the overall image that have the same luminance value as the exemplary pixel. In such a manner, a pixel, or at least fractions thereof, may be counted in one or more of the generated shadows region histogram, highlight region histogram and overall image histogram.

Once the set of original reference image histograms 420 have been generated, by the action 411, from the set of original reference images 410, various moments can be generated for each histogram in the set of original reference image histograms 420. In one embodiment, the generated moments can include an average of the luminance values represented by the histogram, which can be considered as a moment of order 1, a variance of the luminance values represented in the histogram, which can be considered as a moment of order 2, and other moments of different orders. For example, an average of the square root of the luminance values in the histogram can be considered as a moment of order ½. A set of original reference image moments 430 can, in such a manner, be generated from the set of original reference image histograms 420, such as by the generation action 421. Again, as indicated previously, for each original reference image in the set of original reference images 410, multiple original reference image histograms can be generated as part of the set of original reference image histograms 420, and multiple moments can be generated for each of those generated histograms as part of the set of original reference image moments 430.

Additionally, the original reference images in the set of original reference images 410 can be manually optimized, as indicated by the manual optimization action 412, shown in the system 400 of FIG. 4. In one embodiment, such a manual optimization can include a manual, local application of adjustments to both the highlights regions and shadows regions of those original reference images. Such a manual optimization can result in a set of manually optimized reference images 440 that represent an improved visual presentation from the original reference images 410. Colloquially, the set of manually optimized reference images 440 can be considered "the best" that can be achieved, such as by a skilled image editor, given the set of original reference images 410.

A set of manually optimized reference image histograms 450 can be generated from the set of manually optimized reference images 440, such as is shown by the generation action 441, in the same manner in which the set of original reference image histograms 420 were generated from the set of original reference images 410 by the generation action 411. Thus, in one embodiment, the set of manually optimized reference image histograms 450 can comprise multiple histograms for individual manually optimized images in the set of manually optimized reference images 440, including, for example, a manually optimized reference image histogram for the complete manually optimized reference image, and separate manually optimized reference image histograms for only the shadows region and, separately, the highlights region of the manually optimized reference image.

Further, from the histograms in the set of manually optimized reference image histograms 450, one or more moments, such as the moments described above with reference to the set of original moments 430, can be generated. Thus, as shown in the system 400 of FIG. 4, the generation action 451 can generate a set of optimized moments 460 from the set of manually optimized reference image histograms 450.

With the set of original moments 430 and the set of optimized moments 460, a regression analysis 436 can be performed to derive one or more functions 470 that relate original moments to corresponding optimized moments. For example, the regression analysis 436 can generate one function, that can be part of the one or more functions 470, that can describe the relationship between the average of an original reference image histogram that was generated for a whole image, and the average of a manually optimized reference image histogram that was also generated for a whole image. The regression analysis 436 can, as another example, generate a different function, that can also be part of the one or more functions 470, they can describe the relationship between an average of an original reference image histogram that was generated only for a shadows region and an average of a manually optimized reference image histogram that was also generated for only a shadows region. In one embodiment, the regression analysis 436 can derive functions 470 that, for the shadows regions, are directed to moments comprising: an average for the whole image, an average for only the shadows region, a standard deviation for the shadows regions and a square root moment for the whole image and, for the highlights regions, are directed to moments comprising: a variance for the whole image, an average for the whole image, a square root moment for the whole image, an average for only the highlights region and a standard deviation for only the highlights region.

As an example, one function describing the relationship between the average of the original reference image histogram that was generated only for the shadows region and the average of the manually optimized reference image histogram that was generated for only the shadows region can be in the form of: target shadows mean=Min(0.7, 0.6727×original shadows mean+0.3538). As another example, a function describing the relationship between the standard deviation of the original reference image histogram that was generated only for the shadows region and the standard deviation of the manually optimized reference image histogram that was generated for only the shadows region can be in the form of: target shadows standard deviation=Min(0.7, 0.5494×Min(1, original shadows standard deviation)+0.4171). Other exemplary functions can be as follows: for the shadows region, target global mean=Min(0.7, 0.5589×original global mean+0.3001) and target global square root moment=Min(0.8, 0.4891×original global square root moment+0.407). Similarly, for the highlights region, exemplary functions can include: target global variance=Max(0.02, 0.7047×original global variance), target global mean=Max(0.01, 0.7859×original global mean), target global square root moment=0.2, target highlights mean=Max(0.01, 1.3290×original highlights mean−0.4119), and target highlights standard deviation=Max(0.01, 1.3409×(1.0−original highlights standard deviation)−0.3788). Consequently, in one embodiment, the one or more functions 470 can relate the original values to the manually optimized values, or "target" values, of analogous moments of analogous histograms.

Once such one or more functions 470 are obtained, which, in one embodiment, need only be done once initially, they can be utilized in the automatic, and localized, adjustment of subsequent images. For example, the original image 110 can be automatically adjusted in the manner shown in the system 400 of FIG. 4. Initially, one or more image histograms 480 can be generated from the original image 110, as illustrated by the generation action 481. As described in detail above, the one or more image histograms 480 that can be generated can include histograms of the overall image 110, as well as histograms of only the shadows regions, and highlights regions, separately, of the original image 110. From those one or more image histograms 480, multiple image moments 490 can be generated, as illustrated by the generation action 491. As above, the multiple image moments 490 can include, for example, an average of the histogram of the whole original image 110, an average of the histogram of the shadows regions of the original image 110, an average of the histogram of the highlights regions of the original image 110, a variance of the histogram of the whole original image 110, a variance of the histogram of the shadows regions of the original image 110, a variance of the histogram of the highlights regions of the original image 110, and so on.

Utilizing the one or more functions 470, target moments 495 can be generated, as illustrated by the generation action 492. For example, a function, from the one or more functions 470, that can have been generated by the regression analysis 436, that defines the relationship between an average of the histogram of the whole original reference image and an average of a histogram of a whole manually optimized reference image, can be utilized, with the average of the histogram of the whole original image 110, from the moments 490, to generate a target average of a histogram of a whole image, that can be part of the target moments 495. Likewise, a function that defines the relationship between and average of the histogram of the highlights regions of an original reference image and an average of a histogram of the highlights regions of a manually optimized reference image can be utilized with the average of the highlights region histogram, from among the moments 490, to generate a target average of a histogram of only highlights regions that can be part of the target moments 495.

Once the target moments 495 have been generated, the original image 110 can be automatically adjusted, as illustrated by the action 499, until one or more of the target moments 495 are met, thereby producing the auto corrected image 130. More specifically, a region of the original image 110, such as a highlights region or a shadows region, can be initially selected. Subsequently, an initial amount of enhancement in that region can be selected and can be applied in accordance with the descriptions above. For example, if a shadows region of the original image 110 was initially selected, an initial amount of enhancement in the shadows region can be selected and applied by multiplying each pixel in the shadows region with an amount equal to:

$$\frac{\text{amount of enhancement in shadows region} + 1}{\text{amount of enhancement in shadows region} \times \text{luminance} + 1},$$

where the "amount of enhancement in shadows region" is the initial amount of enhancement in the shadows region that was selected to be applied, and the "luminance" is the luminance of the pixel to which that gain is being applied. Similarly, if a highlights region of the original image 110 was initially selected, an initial amount of enhancement in the highlights region can be selected and applied by multiplying each pixel in the highlights region with an amount equal to:

$$\frac{1}{\text{amount of enhancement in highlights region} + 1 - \text{amount of enhancement in highlights region} \times \text{luminance}},$$

where the "amount of enhancement in highlights region" is the initial amount of enhancement in the highlights region that was selected to be applied, and the "luminance" is the luminance of the pixel to which that gain is being applied.

Once this initial amount of enhancement is applied to either the highlights, or shadows, region, one or more updated image histograms can be generated. For example, an updated histogram can be generated for the whole image, after the initial amount of enhancement was applied. Alternatively, or in addition, an updated histogram can be generated for only the shadows, or highlights, region depending on which one was selected to receive the initial enhancement. The generated histograms can then be utilized to generate moments, such as an average, of variance, or other moments, and those moments can be compared to the corresponding target moments 495. For example, an average of the shadows, or highlights, region histogram can be compared to the corresponding target average. In one embodiment, if any one target moment, from among the target moments 495, is met, then adjustments to the original image 110 can be ceased, at least for the region to which those adjustments were applied. In another embodiment, further adjustments can continue to be applied to determine if subsequent applications will result in additional target moments, will be met. In such another embodiment, if subsequent adjustments do not result in additional target moments being met, those adjustments can be undone, if desired.

However, if the initial enhancement was insufficient to result in any of the newly computed moments being equal to at least one target moment, such as the target moments 495, then processing can return to the selection of an amount of enhancement, and a new, greater amount of enhancement can be selected. The processing described above can then be repeated to determine whether the greater amount of enhancement has resulted in the achieving of one or more target moments. In one embodiment, traditional optimization algorithms relying on dichotomy or Newton's methods can be utilized to increase the rate of convergence towards a solution amount.

Once an initially selected region has been adjusted such that at least one relevant target moment has been met, another region can be selected. For example, if the shadows region was initially selected and adjusted until at least one target moment, from among the target moments 495, was met, then the highlights region can be subsequently selected and can be adjusted in the same manner described above. Alternatively, adjustments to the highlights region and the shadows region can occur in an alternating sequence with each adjustment being greater than the last until at least one target moment, from among the target moments 495, was met, or, alternatively, until multiple target moments were met. In such a manner, the automatic adjustment, performed a localized manner individually on the highlights regions and the shadows regions, of the original image 110 can be performed, thereby resulting in the auto corrected image 130, as illustrated by the action 499 of FIG. 4.

Figure 5:
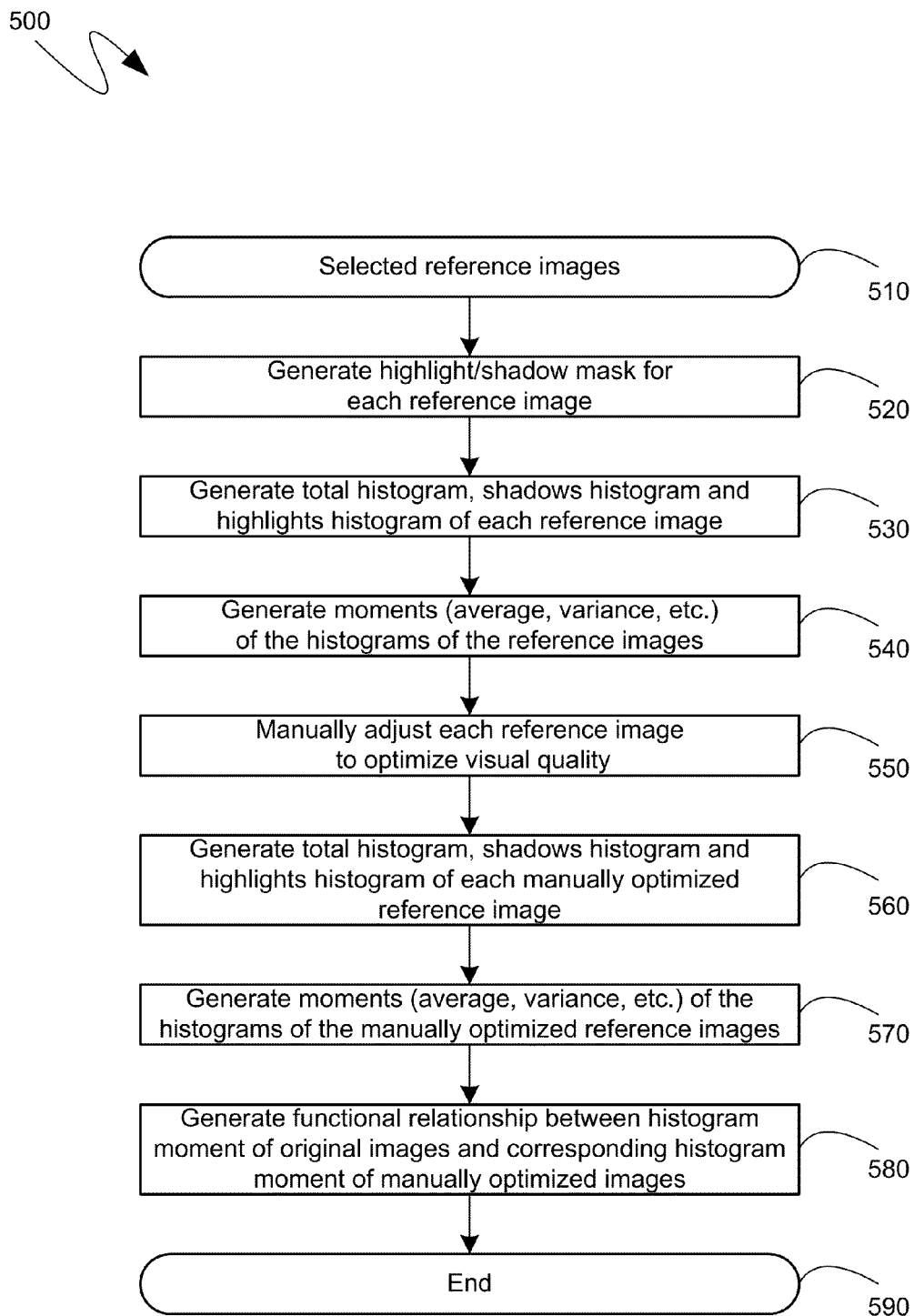
FIG. 5 is a flow diagram of an exemplary mechanism for generating a functional relationship between histogram moments of an original image and target histogram moments.

Turning to FIG. 5, the flow diagram 500 shown therein illustrates an exemplary series of steps by which the functional relationship between histogram moments and target histogram moments can be generated. Initially, as illustrated by the step 510 of the flow diagram 500, a set of one or more reference images can be selected. Subsequently, at step 520, a highlight and shadow mask for each reference image can be generated, such as in accordance with the mechanisms described in detail above. Utilizing the mask generated at step 520, histograms can be generated at step 530 including, for example, a histogram of each overall image, a histogram of only the shadows region of each image, and a histogram of only the highlights region of each image. With the histograms generated at step 530, one or more moments can be generated at step 540 including, for example, an average, which can be considered a moment of order 1, a variance, which can be considered an order of moment 2, and so on. Again, as described above, the moments generated at step 540 can include moments for the overall image histogram as well as moments for only the shadows region histogram, only the highlights region histogram, and other like moments.

Once the relevant moments have been generated at step 540, processing can proceed to step 550 at which point one or more of the reference images that were selected at step 510 can be manually adjusted to optimize their visual quality. For example, at step 550, the above-described enhancements can be applied in a manual manner by a skilled user to adjust the selected images such that the details within highlights and shadows regions that were otherwise not easily visible, become more defined. In an alternative embodiment, at step 550, a skilled user can utilize other known digital photo editing tools to make those adjustments that they deem necessary to render the reference images more pleasing, and otherwise optimize their visual quality. At step 560, after the manual adjustment at step 550, histograms analogous to those generated at step 530 can be generated. For example, at step 560, an overall image histogram, a highlights region histogram, and a shadows region histogram, can be generated. In one embodiment, the highlights region and shadows region can be identified in the adjusted images with the highlight and shadow mask generated previously at step 520 for that image. At step 570, moments, analogous to those generated at step 540, can be generated from the histograms that were generated at step 560. As before, such moments can include the average, the variance, and other light moments.

At step 580, a functional relationship between the histogram moments that were generated at step 540 and those generated at step 570 can be generated. For example, in one embodiment, linear regression can be utilized to generate the functional relationship at step 580. Ultimately, as described in detail above, the functional relationship generated at step 580 can be utilized to generate target moments from known original moments of original images that will be automatically locally enhanced in accordance with the mechanisms described herein. Once such functional relationships are generated at step 580, the relevant processing can end at step 590.

Figure 6:
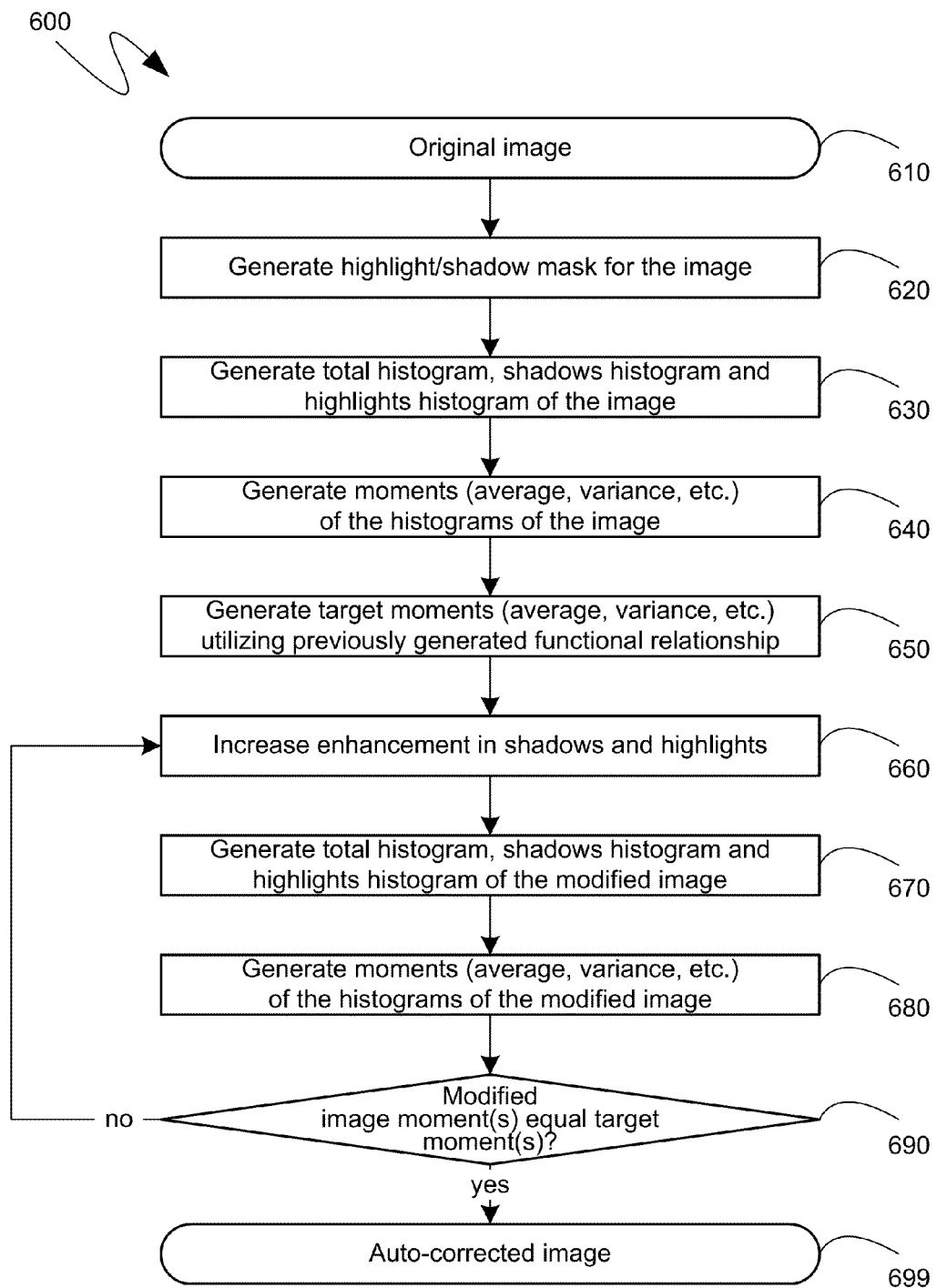
FIG. 6 is a flow diagram of an exemplary mechanism for automatically adjusting the shadows and highlights regions of an image in a localized manner.

Turning to FIG. 6, the flow diagram 600 shown therein illustrates an exemplary series of steps by which an original image can be automatically adjusted in a localized manner. Initially, at step 610, the original image can be obtained, such as by being specified by a user who is desirous of having automatic, localized adjustment applied to the image to improve the visual appearance of the image. Subsequently, at step 620, a highlight and shadow mask for the image specified at step 610 can be generated, such as in the manner described in detail above. Subsequently, at step 630, one or more histograms can be generated for the image that was received at step 610. The histograms generated at step 630 can include a total image histogram, as well as histograms of the shadows regions of the image and highlights regions of the image, as would have been identified utilizing the highlights and shadows mask generated at step 620. At step 640, one or more moments can be generated for the histograms that were generated at step 630. As indicated previously, such moments can include an average value, a variance value, or other values and can be generated for each of the histograms that were generated at step 630.

At step 650, one or more target moments can be generated utilizing the original moments that were generated at step 640 and a predetermined functional relationship between original moments and target moments, such as that generated by the flow diagram 500 (shown in FIG. 5) and, more specifically, such as that generated at step 580 of the flow diagram 500 (both shown in FIG. 5). At step 660, an amount of enhancement to be applied to either the highlights region or the shadows region, can be selected and applied, such as in the manner described in detail above. In one embodiment, the enhancement of one region can proceed until it is complete, and then the enhancement of another region can proceed, while, in another embodiment, the enhancements of multiple regions can proceed in parallel. Once an enhancement has been applied, such as to highlights region, a shadows region, or in parallel to both, at step 660, processing can proceed to step 670 at which point one or more histograms, such as a total image histogram, shadows histogram and the highlights histogram can be generated for the image resulting from the enhancement applied at step 660. At step 680, the relevant moments, such as an average and a variance, and of one or more of the histograms generated at step 670 can be generated. At step 690, the moments that were generated at step 680 can be compared to the corresponding target moments that were generated at step 650. If, at step 690, it is determined that the moments generated at step 680 are equal to the target moments that were generated at step 650, the image that resulted from the enhancements applied at step 660 can become the auto corrected image and can be provided to the user as the auto corrected image, such as is shown by step 699. Conversely, if, at step 690, it is determined that the moments generated at step 680 are not equal to the target moments that were generated at step 650, processing can return to step 660.

As indicated previously, in one embodiment, at step 690, it can be determined if at least one moment is equal to a corresponding target moment. In alternative embodiments, however, the determination, at step 690, can look for an equivalence to multiple target moments, or to the greatest number of target moments, including undoing previously applied enhancements if those previously applied enhancements decreased the number of target moments that were met.

If, at step 690, it is determined that processing should return to step 660, in one embodiment the subsequent enhancement applied at step 660 can be to the same region to which enhancements were previously applied. For example, if the shadows region of the original image, received at step 610, was selected to be enhanced at step 660, then upon a subsequent return to step 660 the shadows region can again be enhanced. Alternatively, if, at step 690, it is determined that processing should return to step 660, the subsequent enhancement applied at step 660 can be to a different region than the region to which enhancements were previously applied. Thus, for example, if the shadows region was selected to be enhanced at step 660 then, upon a subsequent return to step 660, the highlights region, and not the shadows region, can be selected to be enhanced.

Figure 7:
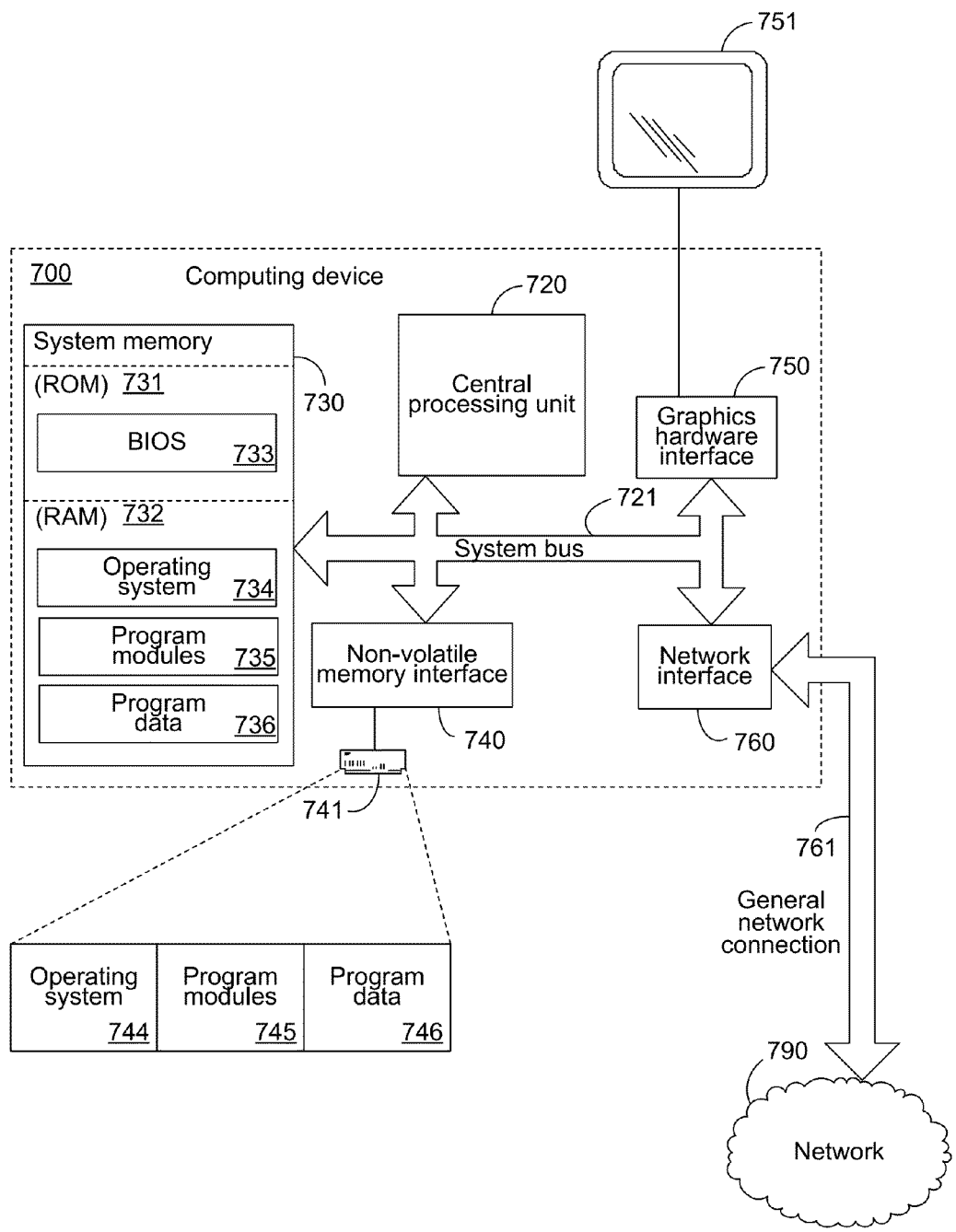
FIG. 7 is a block diagram of an exemplary computing device.

Turning to FIG. 7, an exemplary computing device 700 is illustrated upon which, and in conjunction with which, the above-described mechanisms can be implemented. The exemplary computing device 700 of FIG. 7 can include, but is not limited to, one or more central processing units (CPUs) 720, a system memory 730, that can include RAM 732, and a system bus 721 that couples various system components including the system memory to the processing unit 720. The system bus 721 may be any of several types of bus structures including a memory bus or memory controller, a peripheral bus, and a local bus using any of a variety of bus architectures. The computing device 700 can include graphics hardware, such as for the display of images, such as those that can be automatically and locally enhanced, such as in the manner described in detail above. The graphics hardware of the computing device 700 can include, but is not limited to, a graphics hardware interface 750 and a display device 751. Additionally, the computing device 700 can also include graphics input hardware such as a digital video camera (not shown) from which digital images can be obtained. The graphics hardware can be communicationally coupled to the system bus 721.

The computing device 700 also typically includes computer readable media, which can include any available media that can be accessed by computing device 700 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 700. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and the aforementioned RAM 732. A basic input/output system 733 (BIOS), containing the basic routines that help to transfer information between elements within computing device 700, such as during start-up, is typically stored in ROM 731. RAM 732 typically contains data and/or program modules that are immediately accessible to and/or presently being operated on by processing unit 720. By way of example, and not limitation, FIG. 7 illustrates the operating system 734 along with other program modules 735, and program data 736.

The computing device 700 may also include other removable/non-removable, volatile/nonvolatile computer storage media. By way of example only, FIG. 7 illustrates the hard disk drive 741 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740.

The drives and their associated computer storage media discussed above and illustrated in FIG. 7, provide storage of computer readable instructions, data structures, program modules and other data for the computing device 700. In FIG. 7, for example, hard disk drive 741 is illustrated as storing operating system 744, other program modules 745, and program data 746. Note that these components can either be the same as or different from operating system 734, other program modules 735 and program data 736. Operating system 744, other program modules 745 and program data 746 are given different numbers hereto illustrate that, at a minimum, they are different copies.

The computing device 700 can operate in a networked environment using logical connections to one or more remote computers. The computing device 700 is illustrated as being connected to the general network connection 761 through a network interface or adapter 760 which is, in turn, connected to the system bus 721. In a networked environment, program modules depicted relative to the computing device 700, or portions or peripherals thereof, may be stored in the memory of one or more other computing devices that are communicatively coupled to the computing device 700 through the general network connection 771. It will be appreciated that the network connections shown are exemplary and other means of establishing a communications link between computing devices may be used.

As can be seen from the above descriptions, mechanisms for automatically, and locally, adjusting and enhancing digital images have been enumerated. In view of the many possible variations of the subject matter described herein, we claim as our invention all such embodiments as may come within the scope of the following claims and equivalents thereto.

We claim:

1. One or more computer-readable memory comprising computer-executable instructions for automatically adjusting a digital image in a localized manner, the computer-executable instructions performing steps comprising:

generating a mask delineating a highlights region of the digital image from a shadows region of the digital image;
generating one or more histograms of the digital image;
generating one or more moments from the one or more histograms of the digital image;
generating one or more target moments from the one or more moments;
applying an adjustment to a region, as delineated by the mask, of the digital image to obtain an adjusted image;
generating one or more adjusted histograms of the adjusted image corresponding to at least some of the one or more histograms generated of the digital image;
generating one or more adjusted moments from the one or more adjusted histograms, the one or more adjusted moments corresponding to at least some of the moments generated from the one or more histograms; and
repeating, with the adjustment greater than a previously applied adjustment, the applying the adjustment, the generating the one or more adjusted histograms, and the generating the one or more adjusted moments, if none of the adjusted moments are equal to corresponding target moments.

2. The computer-readable memory of claim 1, wherein the computer-executable instructions for generating the mask comprise computer-executable instructions for: applying a Gaussian blur to the digital image and generating the mask from a blend of the Gaussian blur and the digital image, the blend emphasizing the digital image over the Gaussian blurred digital image in areas where a gradient of the Gaussian blur is near its theoretical maximum.

3. The computer-readable memory of claim 1, wherein the computer-executable instructions for generating the one or more histograms comprise computer-executable instructions for generating a highlights region histogram of only the highlights region of the digital image and a shadows region histogram of only the shadows region of the digital image.

4. The computer-readable memory of claim 1, wherein the computer-executable instructions for generating the one or more moments comprise computer-executable instructions for generating an average of individual ones of the one or more histograms and a variance of individual ones of the one or more histograms.

5. The computer-readable memory of claim 1, comprising further computer-executable instructions for: repeating, with the region being different than a previous region to which previous adjustments were applied, the applying the adjustment, the generating the one or more adjusted histograms, and the generating the one or more adjusted moments, if at least one of the adjusted moments was equal to corresponding target moments.

6. The computer-readable memory of claim 1, wherein the repeating is performed alternatively to the highlights region and the shadows region.

7. The computer-readable memory of claim 1, comprising further computer-executable instructions for: repeating, with the adjustment greater than a previously applied adjustment, the applying the adjustment, the generating the one or more adjusted histograms, and the generating the one or more adjusted moments, even if at least one of the adjusted moments are equal to corresponding target moments to determine if the repeating will result in more adjusted moments being equal to corresponding target moments.

8. The computer-readable memory of claim 1, wherein the computer-executable instructions for generating the one or more target moments comprise computer-executable instructions for performing steps comprising:

generating masks for each reference image in a set of reference images, the generated masks delineating a highlights region of a reference image from a shadows region of the reference image;

generating one or more reference image histograms for each reference image in the set of reference images;

generating one or more reference image moments from the one or more reference image histograms for each reference image in the set of reference images;

manually optimizing a visual appearance of each reference image in the set of reference images to enhance details in the highlights region and the shadows region;

generating one or more optimized histograms for each manually optimized reference image in the set of reference images;

generating one or more optimized moments from the one or more optimized histograms for each reference image in the set of reference images;

generating a functional relationship between individual ones of the one or more moments and corresponding ones of the one or more optimized moments; and utilizing the generated functional relationship to generate the one or more target moments from the one or more moments.

9. A method of generating an improved image by automatically adjusting a digital image in a localized manner, the method comprising the steps of:

generating a mask delineating a highlights region of the digital image from a shadows region of the digital image;

generating one or more histograms of the digital image;

generating one or more moments from the one or more histograms of the digital image;

generating one or more target moments from the one or more moments;

applying an adjustment to a region, as delineated by the mask, of the digital image to obtain an adjusted image;

generating one or more adjusted histograms of the adjusted image corresponding to at least some of the one or more histograms generated of the digital image;

generating one or more adjusted moments from the one or more adjusted histograms, the one or more adjusted moments corresponding to at least some of the moments generated from the one or more histograms; and repeating, with the adjustment greater than a previously applied adjustment, the applying the adjustment, the generating the one or more adjusted histograms, and the generating the one or more adjusted moments, if none of the adjusted moments are equal to corresponding target moments.

10. The method of claim 9, wherein the generating the mask comprises applying a Gaussian blur to the digital image and generating the mask from a blend of the Gaussian blur and the digital image, the blend emphasizing the digital image over the Gaussian blurred digital image in areas where a gradient of the Gaussian blur is near its theoretical maximum.

11. The method of claim 9, wherein the generating the one or more histograms comprises generating a highlights region histogram of only the highlights region of the digital image and a shadows region histogram of only the shadows region of the digital image.

12. The method of claim 9, wherein the generating the one or more moments comprises generating an average of individual ones of the one or more histograms and a variance of individual ones of the one or more histograms.

13. The method of claim 9, further comprising the steps of: repeating, with the region being different than a previous region to which previous adjustments were applied, the applying the adjustment, the generating the one or more adjusted histograms, and the generating the one or more adjusted moments, if at least one of the adjusted moments was equal to corresponding target moments.

14. The method of claim 9, wherein the repeating is performed alternatively to the highlights region and the shadows region.

15. The method of claim 9, further comprising the steps of: repeating, with the adjustment greater than a previously applied adjustment, the applying the adjustment, the generating the one or more adjusted histograms, and the generating the one or more adjusted moments, even if at least one of the adjusted moments are equal to corresponding target moments to determine if the repeating will result in more adjusted moments being equal to corresponding target moments.

16. The method of claim 9, wherein the generating the one or more target moments comprises:

generating masks for each reference image in a set of reference images, the generated masks delineating a highlights region of a reference image from a shadows region of the reference image;

generating one or more reference image histograms for each reference image in the set of reference images;

generating one or more reference image moments from the one or more reference image histograms for each reference image in the set of reference images;

manually optimizing a visual appearance of each reference image in the set of reference images to enhance details in the highlights region and the shadows region;

generating one or more optimized histograms for each manually optimized reference image in the set of reference images;

generating one or more optimized moments from the one or more optimized histograms for each reference image in the set of reference images;

generating a functional relationship between individual ones of the one or more moments and corresponding ones of the one or more optimized moments; and utilizing the generated functional relationship to generate the one or more target moments from the one or more moments.

17. One or more computer-readable memory comprising computer-executable instructions for generating a functional relationship between original histogram moments and target histogram moments, the computer-executable instructions performing steps comprising:

generating masks for each reference image in a set of reference images, the generated masks delineating a highlights region of a reference image from a shadows region of the reference image;

generating one or more histograms for each reference image in the set of reference images;

generating one or more moments from the one or more histograms for each reference image in the set of reference images;

manually optimizing a visual appearance of each reference image in the set of reference images to enhance details in the highlights region and the shadows region;

generating one or more optimized histograms for each manually optimized reference image in the set of reference images;

generating one or more optimized moments from the one or more optimized histograms for each reference image in the set of reference images; and generating a functional relationship between individual ones of the one or more moments and corresponding ones of the one or more optimized moments.

18. The computer-readable memory of claim 17, wherein the computer-executable instructions for generating the one or more histograms comprise computer-executable instructions for generating a highlights region histogram of only the highlights region of the reference image and a shadows region histogram of only the shadows region of the reference image; and wherein further the computer-executable instructions for generating the one or more optimized histograms comprise computer-executable instructions for generating an optimized highlights region histogram of only the highlights region of the manually optimized reference image and an optimized shadows region histogram of only the shadows region of the manually optimized reference image.

19. The computer-readable memory of claim 17, wherein the computer-executable instructions for generating the functional relationship between the individual ones of the one or more moments and the corresponding ones of the one or more optimized moments comprise computer-executable instructions for performing a linear regression.

20. The computer-readable memory of claim 17 comprising further computer-executable instructions for: building the set of references images by selecting images exhibiting a typical loss of detail in highlights regions and shadows regions.

* * * * *